United States Patent
Hori

(10) Patent No.: US 10,594,744 B2
(45) Date of Patent: Mar. 17, 2020

(54) SPEECH COMMUNICATION TERMINAL, INTERMEDIATE NODE, PROCESSING DEVICE, CONNECTION METHOD, AND NON-TRANSITORY COMPUTER-READABLE RECORDING MEDIUM

(71) Applicant: Panasonic Intellectual Property Corporation of America, Torrance, CA (US)

(72) Inventor: Takako Hori, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 106 days.

(21) Appl. No.: 15/193,212

(22) Filed: Jun. 27, 2016

(65) Prior Publication Data
US 2016/0308919 A1    Oct. 20, 2016

Related U.S. Application Data

(63) Continuation of application No. PCT/JP2015/000619, filed on Feb. 12, 2015.

(30) Foreign Application Priority Data

Feb. 28, 2014  (JP) ................. 2014-039436

(51) Int. Cl.
*H04L 29/06* (2006.01)
*H04L 12/853* (2013.01)
*H04W 36/00* (2009.01)

(52) U.S. Cl.
CPC ...... *H04L 65/1069* (2013.01); *H04L 65/1006* (2013.01); *H04L 65/1016* (2013.01);
(Continued)

(58) Field of Classification Search
CPC ............. H04L 47/2416; H04L 65/1006; H04L 65/1016; H04L 65/1069; H04L 65/1033; H04L 65/403
See application file for complete search history.

(56) References Cited

U.S. PATENT DOCUMENTS

2002/0184373 A1\* 12/2002 Maes ................. G10L 15/30
709/228
2003/0063569 A1\* 4/2003 Kalliokulju ....... H04L 29/06027
370/252

(Continued)

FOREIGN PATENT DOCUMENTS

JP  2005-318534  11/2005
JP  2008-530921  8/2008
(Continued)

OTHER PUBLICATIONS

Extended European Search Report, dated Feb. 20, 2017, for corresponding EP Application No. 15755416.3-1853 / 3113468, 9 pages.
(Continued)

*Primary Examiner* — Edan Orgad
*Assistant Examiner* — Nourali Mansoury
(74) *Attorney, Agent, or Firm* — Seed IP Law Group LLP

(57) ABSTRACT

In a connection method between speech communication terminals, a first speech communication terminal states a first category including multiple speech codec modes in an SDP offer and transmits to a second communication speech terminal. The second communication speech terminal selects, and states in an SDP answer as a second category, multiple modes from among the first category stated in the SDP offer, and transmits to the first speech communication terminal. At least one of the SDP offer and the SDP answer states a request for a maximum bandwidth or a bandwidth of
(Continued)

a mode of highest priority from among the speech codec modes included in the second category.

11 Claims, 12 Drawing Sheets

(52) U.S. Cl.
CPC ........ *H04L 65/1033* (2013.01); *H04L 65/403* (2013.01); *H04L 65/608* (2013.01); *H04L 65/80* (2013.01); H04L 47/2416 (2013.01); H04W 36/0022 (2013.01)

(56) References Cited

U.S. PATENT DOCUMENTS

| | | | |
|---|---|---|---|
| 2005/0237931 A1 | 10/2005 | Punj et al. | |
| 2008/0089324 A1* | 4/2008 | Polk | H04L 65/608 370/389 |
| 2008/0102749 A1 | 5/2008 | Becker | |
| 2008/0270618 A1* | 10/2008 | Rosenberg | H04L 65/1069 709/228 |
| 2009/0252149 A1* | 10/2009 | Zhu | H04M 7/1255 370/352 |
| 2010/0195521 A1 | 8/2010 | Wanstedt et al. | |
| 2011/0243149 A1* | 10/2011 | Xie | H04L 65/1016 370/410 |
| 2013/0021998 A1* | 1/2013 | Shatsky | H04W 28/26 370/329 |
| 2014/0342739 A1 | 11/2014 | Hori | |

FOREIGN PATENT DOCUMENTS

| | | |
|---|---|---|
| JP | 2010-533419 | 10/2010 |
| JP | 2013-012855 | 1/2013 |
| JP | 2013-012856 | 1/2013 |
| WO | 2012/116881 A1 | 9/2012 |
| WO | 2013/080471 | 6/2013 |

OTHER PUBLICATIONS

Handley et al., "SDP: Session Description Protocol," Network Working Group, Internet Society (ISOC), Geneva, Switzerland, Jul. 1, 2006, 49, pages.
Rosenberg et al., "An Offer/Answer Model with the Session Description Protocol (SDP)," Network Working Group, Internet Society (ISOC), Geneva, Switzerland, Jun. 1, 2002, 26 pages.
International Search Report of PCT application No. PCT/JP2015/000619 dated Apr. 21, 2015.
Takuya Sawada et al., "SIP practice", pp. 248-253, Nov. 2005 (Partial Translation).
3GPP TS 23.216 V12.0.0 "Single Radio Voice Call Continuity (Release 12)" Dec. 2013.
3GPPSA4-EVS SWG Conference Call #29, AHEVS-272, NTT and NTT DOCOMO INC, "Discussion on RTP payload format for AMR-WB IO" Aug. 2013.
G. Camarillo et al., "Grouping of Media Lines in the Session Description Protocol (SDP)" RFC:3388, Dec. 2002.
3GPP TS 23.237 V12.5.0 "IP Multimedia Subsystem (IMS) Service Continuity (Release 12)" Dec. 2013.
Communication pursuant to Article 94(3) EPC dated Feb. 25, 2019 for the related European Patent Application No. 15755416.3.
Schulzrinne Columbia University S Casner Packet Design H: "RTP Profile for Audio and Video Conferences with Minimal Control; ric3551.txt", RTP Profile for Audio and Video Conferences With Minimal Control; RFC3551.TXT, Internet Engineering Task Force, IETF, Standard, Internet Society (ISOC) 4, Rue Des Falaises Ch-1205 Switzerland, Jul. 1, 2003 (Jul. 1, 2003), XP015009333.

* cited by examiner

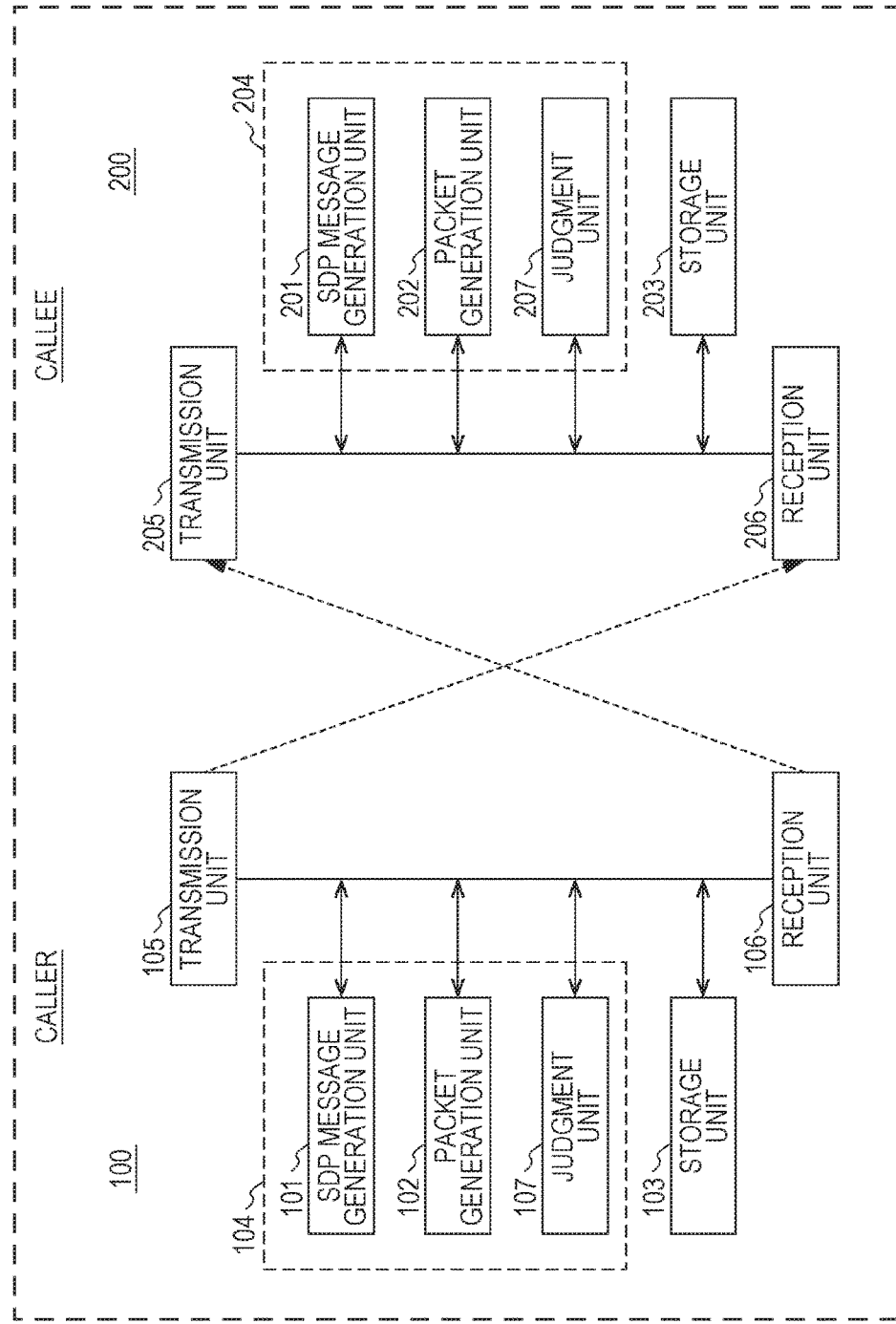

FIG. 2C
```
m=audio 49152 RTP/AVP 97 98
b=AS: 80
a=rtpmap:97 EVS/32000
a=rtpmap:100 AMR-WB/16000
```

FIG. 3
```
m=audio 49152 RTP/AVP 97 98 99 100
b=AS: 80
a=group: PT 97 98 99 100          ← EXPLICITLY STATE GROUP RELATIONSHIP
a=rtpmap:97 EVS-SWB/32000
a=rtpmap:98 EVS-WB/16000
a=rtpmap:99 EVS-NB/8000
a=rtpmap:100 AMR-WB/16000
```

FIG. 4A
```
m=audio 49152 RTP/AVP 97 98 99 100
b=AS: 80
a=rtpmap:97 EVS-SWB/32000
a=rtpmap:98 EVS-WB/16000
a=rtpmap:99 EVS-NB/8000
a=rtpmap:100 AMR-WB/16000
```

FIG. 4B
```
m=audio 49152 RTP/AVP 100
b=AS: 80
a=rtpmap:100 AMR-WB/16000
```

FIG. 4C
```
m=audio 49152 RTP/AVP 97 98 99 100
b=AS: 30
a=rtpmap:97 EVS-NB/8000
a=rtpmap:98 EVS-WB/16000
a=rtpmap:99 EVS-SWB/32000
a=rtpmap:100 AMR-WB/16000
```

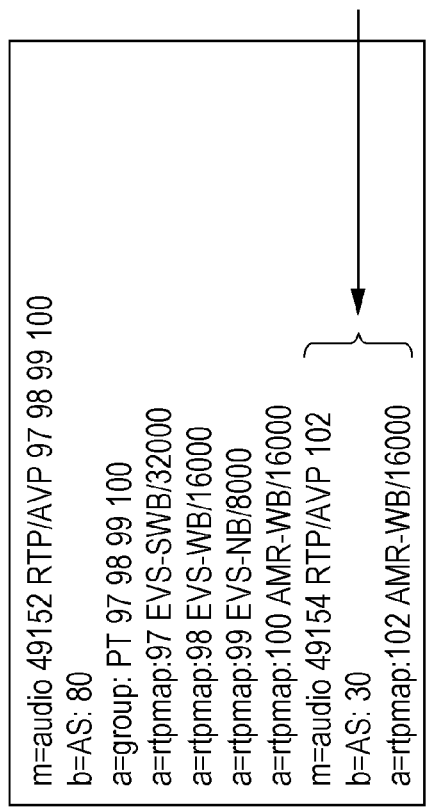

FIG. 9 (Prior Art)

SDP offer

```
m=audio 49152 RTP/AVP 97 98 99 100
a=tcap:1 RTP/AVPF
a=pcfg:1 t=1
a=rtpmap:97 AMR-WB/16000/1
a=fmtp:97 mode-change-capability=2; max-red=220
a=rtpmap:98 AMR-WB/16000/1
a=fmtp:98 mode-change-capability=2; max-red=220; octet-align=1
a=rtpmap:99 AMR/8000/1
a=fmtp:99 mode-change-capability=2; max-red=220
a=rtpmap:100 AMR/8000/1
a=fmtp:100 mode-change-capability=2; max-red=220; octet-align=1
a=ptime:20
a=maxptime:240
```

SDP answer

```
m=audio 49152 RTP/AVPF 97
a=acfg:1 t=1
a=rtpmap:97 AMR-WB/16000/1
a=fmtp:97 mode-change-capability=2; max-red=200
a=ptime:40
a=maxptime:240
```

SPEECH COMMUNICATION TERMINAL, INTERMEDIATE NODE, PROCESSING DEVICE, CONNECTION METHOD, AND NON-TRANSITORY COMPUTER-READABLE RECORDING MEDIUM

BACKGROUND

1. Technical Field

The present disclosure relates to a speech communication terminal and connection method used for applications such as Voice over IP (VoIP), and relates to technology that switches the mode of the speech codec.

2. Description of the Related Art

In a communication system according to a standard such as 3GPP, call control is conducted when user equipment (hereinafter, UE) conducts communicated based on the Internet Protocol (IP). With call control, an IP address and port number to use for communication is exchanged with the communication peer, the speech codec to use for communication is negotiated, and a data pathway is secured, for example. Call control according to 3GPP is conducted over an IP Multimedia Subsystem (IMS). An IMS network is a network for managing information for the purpose of call control, routing call control signal messages (Session Initiation Protocol (SIP) messages), and interconnecting with 3GPP legacy networks and networks other than 3GPP (see, for example, 3GPP TS 23.237 V12.5.0 "IP Multimedia Subsystem (IMS) Service Continuity").

FIG. 8 is a flowchart illustrating an example of a procedure leading up to VoIP telephony using the 3GPP IMS. FIG. 8 illustrates an example flowchart for the case of a UE 100 calling a UE 102. As illustrated in FIG. 8, a SIP INVITE message is transmitted over the IMS network from the UE 100 to the UE 102 (ST11), and a SIP 183 Session Progress message is transmitted over the IMS network from the UE 102 to the UE 100 (ST12). In this way, the SIP INVITE message and the SIP 183 Session Progress message are exchanged between UEs, and a negotiation related to communication is conducted.

A Session Description Protocol (SDP) offer is attached to the SIP INVITE message. The SDP offer states information needed to conduct VoIP communication, such as supported speech codecs and candidates related to the payload format, for example. The UE 102, upon receiving the SIP INVITE message in ST11, selects appropriate media information such as a speech codec from among the multiple candidates stated in the SDP offer, and states the selected media information in an SDP answer. The UE 102 attaches the SDP answer to the SIP 183 Session Progress message and transmits to the UE 100 in ST12.

The media information selected by the UE 102 is analyzed by the IMS network, and instructions to allocate resources corresponding to the analysis result to the current communication session are output to the IP core network. If there is a communication pathway (General Packet Radio Service (GPRS)) corresponding to the requested resources, a PDP context (or an EPS bearer in the case of the Evolved Packet System (EPS)) is established. Following the instructions from the IMS network, a resource allocation process is conducted on the IP core network and the radio access network (ST13). After the resource allocation process is completed, a user call is conducted on the UE 102 (ST14). If the user responds, a 200 OK message is transmitted to the UE 100 (ST15), and telephony is initiated between the UE 100 and the UE 102 (ST16).

FIG. 9 illustrates an example of an SDP offer and an SDP answer. In FIG. 9, with the SDP offer, the UE 100 is offering the four modes of (the payload format of) the Adaptive Multi-Rate-Wideband (AMR-WB) bandwidth-efficiency mode, (the payload format of) the AMR-WB octet-align mode, the AMR bandwidth-efficiency mode, and the AMR octet-align mode. The UE 102 has selected the AMR-WB bandwidth-efficiency mode.

Additionally, in the case of changing the speech codec or mode during telephony, it is necessary to exchange IMS signaling messages again, or in other words an SDP offer and an SDP answer, and conduct renegotiation.

At this point, some speech codecs have multiple modes. The Enhanced Voice Service (EVS) standardized by the 3GPP is one such example. According to literature of the related art (S4-130778: EVS-4 Design Constraints), EVS has AMR-WB interoperable modes (hereinafter, interoperable modes), as well as AMR-WB non-interoperable modes (hereinafter, non-interoperable modes or native modes), which include a narrowband (NB) mode, a wideband (WB) mode, a super wideband (SWB) mode, and a full band (FB) mode.

In some cases, these modes may need to be switched in the middle of a session. For example, in some cases, the speech codec changes for one of the UEs during communication due to Single Radio Voice Communication Continuity (SRVCC) or SRVCC with ATCF enhancement described in 3GPP TS 23.216 V12.0.0 "Single Radio Voice Call Continuity (SRVCC)". The case of SRVCC will be described using FIG. 10.

For example, suppose that while two terminals UE 100 and UE 102 are communicating using the EVS SWB mode, the UE 100 performs an SRVCC handover from an LTE coverage area (PS) to a circuit-switching network (CS). Since EVS is not supported on the circuit-switching network, the speech codec used by the UE 100 changes to a speech codec supported by the circuit-switching network (such as AMR or AMR-WB, for example). At this point, it is necessary to conduct IMS session renegotiation to also change the speech codec on the UE 102 side to AMR or AMR-WB, or not conduct the session renegotiation and instead perform transcoding at an intermediate gateway (see Japanese Unexamined Patent Application Publication No. 2013-12855 and Japanese Unexamined Patent Application Publication No. 2013-12856). In the case of transcoding, it is desirable from a quality perspective for the bandwidth of both terminals to be aligned. Thus, for example, when the speech codec of the UE 100 switches to AMR, it is desirable to switch to EVS NB mode on the UE 102 side without a session renegotiation. Likewise, when the speech codec of the UE 100 switches to AMR-WB, it is desirable to switch to EVS WB or AMR-WB interoperable mode on the UE 102 side without a session renegotiation.

Next, a mode switching method will be described. As one method of switching among these modes in the middle of a session without renegotiating by IMS signaling messages, there is a method of including all mode-related information in the RTP payload.

FIG. 11 is a diagram illustrating the structure of an RTP packet. An RTP packet is made up of an IP header, a UDP header, an RTP header, and an RTP payload. The RTP payload is the data portion (payload) carried by the RTP packet. In other words, according to the above method, information about modes may be obtained by checking the content of the RTP payload.

However, AHEVS-272 3GPPSA4-EVS SWG Conference Call #29 (Aug. 29, 2013) proposes a method of putting information in the RTP header rather than putting information in the RTP payload. In other words, as in FIG. 11, first, separate payload type (PT) numbers (97, 98, 99, 100) are assigned to the NB, WB, and SWB AMR-WB non-interoperable modes as well as the AMR-WB interoperable mode and stated in the SDP offer. Next, all modes are selected as a group in the SDP answer. Subsequently, when switching modes becomes necessary, the payload type number corresponding to the mode after the switch is stated in the payload type (PT) field of the RTP header, thereby switching the mode. This method is called payload type (PT) switching.

SUMMARY

However, with payload type switching, if the sampling rate is different depending on the mode, the method of increasing the timestamp in the RTP header is inconsistent among the modes. As a result, there is a problem in that playback control using a protocol such as the Real-time Control Protocol (RTCP) cannot be performed successfully, for example.

One non-limiting and exemplary embodiment provides a speech communication terminal and other technology having high telephony quality without interruptions in telephony by smoothly switching the mode of the speech codec. Specifically, there is a provided technology such as a speech codec mode switching method and a speech communication terminal enabling playback control and bandwidth guaranteeing (bandwidth reservation) techniques of the past, even if the codec includes multiple modes with different sampling rates or requested bandwidth.

In one general aspect, the techniques disclosed here feature a connection method for connecting speech communication terminals, in which a first speech communication terminal states a first category including multiple speech codec modes in an SDP offer and transmits to a second communication speech terminal. The second communication speech terminal selects, and states in an SDP answer as a second category, multiple modes from among the first category stated in the SDP offer, and transmits to the first speech communication terminal. At least one of the SDP offer and the SDP answer states a request for a maximum bandwidth or a bandwidth of a mode of highest priority from among the speech codec modes included in the second category.

In a speech communication terminal and other technology of the present disclosure, the mode of the speech codec may be switched smoothly, thereby enabling higher telephony quality without interruptions in telephony. Specifically, according to technology such as a speech codec mode switching method and a speech communication terminal of the present disclosure, playback control and bandwidth guaranteeing (bandwidth reservation) techniques of the past may be used, even if the codec includes multiple modes with different sampling rates or requested bandwidth.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a configuration diagram of a speech communication terminal according to Embodiment 1 of the present disclosure;

FIG. 2C is an explanatory diagram illustrating an SDP offer according to Embodiment 1 of the present disclosure;

FIG. 3 is an explanatory diagram illustrating another SDP offer according to Embodiment 1 of the present disclosure;

FIG. 4A is an explanatory diagram illustrating an SDP answer according to Embodiment 1 of the present disclosure;

FIG. 4B is an explanatory diagram illustrating an SDP answer according to Embodiment 1 of the present disclosure;

FIG. 4C is an explanatory diagram illustrating an SDP answer according to Embodiment 1 of the present disclosure;

FIG. 6B is an explanatory diagram illustrating an SDP offer according to Embodiment 2 of the present disclosure;

FIG. 9 is an explanatory diagram illustrating an SDP offer and answer according to technology of the related art;

DETAILED DESCRIPTION

Figure 2A:
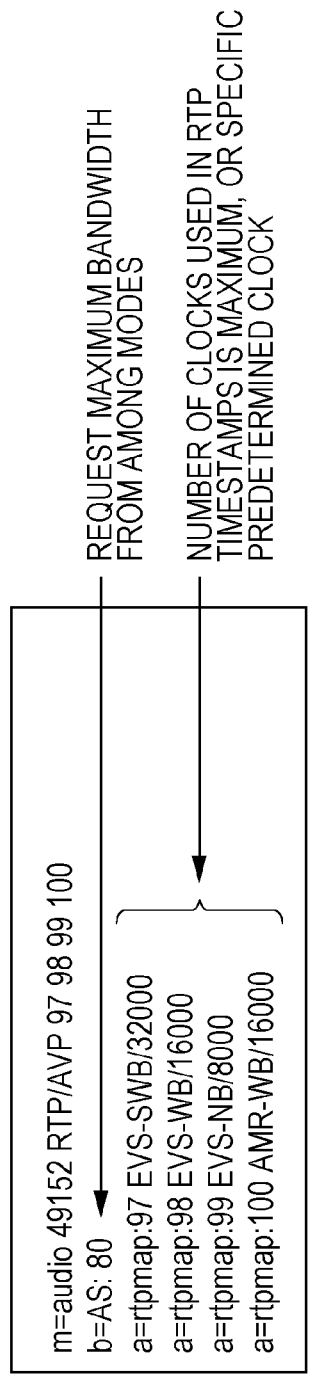
FIG. 2A is an explanatory diagram illustrating an SDP offer according to Embodiment 1 of the present disclosure.

Hereinafter, the configuration and operation of embodiments of the present disclosure will be described with reference to the drawings.

Note that in this specification, the "first category" is a set including multiple speech codec modes, and encompasses not only the case of stating a name representing the set, but also the case of listing the speech codec and speech codec modes which are elements of the set.

The "second category" is a set including multiple speech codec modes, and encompasses not only the case of stating a name representing the set, but also the case of listing the speech codec and speech codec modes which are elements of the set. The number of speech codec modes included in the second category is the same as or less than the number of speech codec modes included in the first category.

"Predetermined" encompasses not only the case of a specific clock rate being determined uniquely in advance, but also the case of a method of deciding the clock rate being uniquely determined.

"From the callee speech communication terminal" encompasses not only the case of receiving from the callee speech communication terminal directly, but also the case of receiving through one or more intermediate nodes. In the case of going through an intermediate node, when an SDP answer undergoes a change at an intermediate node, obviously the changed SDP answer is received by the reception unit.

"From the caller speech communication terminal" encompasses not only the case of receiving from the caller speech communication terminal directly, but also the case of receiving via one or more intermediate nodes. In the case of going through an intermediate node, when an SDP offer undergoes a change at an intermediate node, obviously the changed SDP offer is received by the reception unit.

(Underlying Knowledge Forming Basis of Present Disclosure)

Several issues exist with payload type switching of the related art.

First, if the sampling rate is different depending on the mode, the method of increasing the timestamp in the RTP header is inconsistent among the modes (Issue 1). As a result, there is a problem in that playback control using a protocol such as the Real-time Control Protocol (RTCP) cannot be performed successfully, for example.

Next, if the requested bandwidth (bit rate) also differs depending on the mode (Issue 2), there is a problem of being unable to suitably guarantee the requested bandwidth on the network side.

As a method of addressing these issues, a conceivable method is to assign a separate EPS bearer to each mode and handle each mode separately. For example, RFC 3388 Grouping of Media Lines in SDP (December 2002) discloses a method of grouping and handling multiple speech codecs assigned with separate EPS bearers as a single ETP flow. This method allocates a separate port number to each speech codec to clearly express the group relationship of these speech codecs, and treats the speech codecs as a single RTP session. However, RFC 3388 Grouping of Media Lines in SDP (December 2002) assumes that the sampling rates of the grouped speech codecs are the same, and thus the above (Issue 1) is not addressed. Furthermore, the method of extending multiple bearers also has the demerits of imposing the burden of managing the bearers on the intermediate node, and requiring signaling to activate the bearers for previously unused modes when the mode is switched.

The present disclosure provides a speech communication terminal and other technology having high telephony quality without interruptions in telephony by smoothly switching the mode of the speech codec. Specifically, there is a provided technology such as a speech codec mode switching method and a speech communication terminal enabling playback control and bandwidth guaranteeing (bandwidth reservation) of the past, even if the codec includes multiple modes with different sampling rates or requested bandwidth.

(Embodiment 1)

FIG. 1 is a block diagram illustrating a configuration of a speech communication terminal according to Embodiment 1. The left side of FIG. 1 is a caller speech communication terminal 100, while the right side of FIG. 1 is a callee speech communication terminal 200. The caller speech communication terminal 100 primarily includes an SDP message generation unit 101, a packet generation unit 102, a storage unit 103, a control unit 104, a transmission unit 105, a reception unit 106, and a judgment unit 107. In addition, the callee speech communication terminal 200 primarily includes an SDP message generation unit 201, a packet generation unit 202, a storage unit 203, a control unit 204, a transmission unit 205, a reception unit 206, and a judgment unit 207.

Figure 2B:
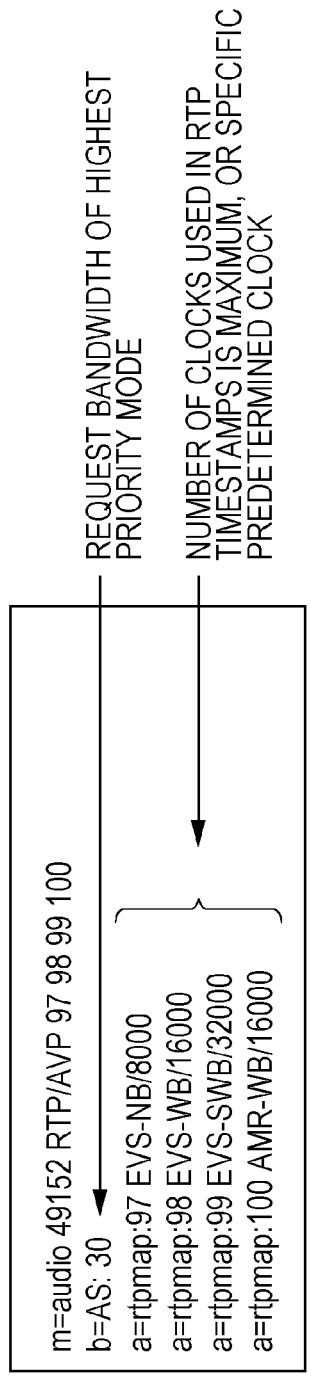
FIG. 2B is an explanatory diagram illustrating an SDP offer according to Embodiment 1 of the present disclosure.

The SDP message generation unit 101 generates an SDP offer in a SIP INVITE message. At this point, the judgment unit 107 judges the requested bandwidth when the SDP message generation unit 101 generates the SDP offer. FIGS. 2A and 2B are examples of an SDP offer generated by the SDP message generation unit 101. In the media field of the SDP offer, the speech codecs and speech codec modes that the caller speech communication terminal 100 supports are stated. In the case of FIGS. 2A and 2B, the caller speech communication terminal 100 supports the four modes of the EVS AMR-WB non-interoperable mode (SWB), the EVS AMR-WB non-interoperable mode (WB), the EVS AMR-WB non-interoperable mode (NB), and the EVS AMR-WB interoperable mode (WB). These four modes constitute a first category. The inclusion of the EVS AMR-WB interoperable mode (WB) is for the case in which the callee speech communication terminal 200 that receives the SDP offer does not support EVS and only supports legacy AMR-WB, and enables such a callee speech communication terminal 200 to select and respond with only the AMR-WB line (payload type 100).

Note that, as in FIG. 2C, the EVS AMR-WB non-interoperable mode (SWB), the EVS AMR-WB non-interoperable mode (WB), and the EVS AMR-WB non-interoperable mode (NB) may also be collectively stated on a single line as EVS/32000, for example. In this way, the first category may include a name representing a collective set of multiple speech codec modes, or the first category itself may be a name representing a collective set of multiple modes.

In the same media field of the SDP offer, based on the judgment of the requested bandwidth by the judgment unit 107, the maximum bandwidth request used by the modes included in the first category, or in other words the modes that the caller speech communication terminal 100 supports, is stated like in FIG. 2A. For example, if the SWB and WB modes request a maximum of 80 kbps while the NB mode and the AMR-WB interoperable mode (VVB) request a maximum of 30 kbps, the bandwidth stated in the SDP offer becomes 80 kbps.

Alternatively, in the media field of the SDP offer, based on the judgment of the requested bandwidth by the judgment unit 107, the bandwidth request of the mode with the highest priority from among the modes included in the first category, or in other words the modes that the caller speech communication terminal 100 supports, is stated like in FIG. 2B. For example, if the NB band is the mode with the highest priority, the bandwidth stated in the SDP offer becomes 30 kbps. The priority may be judged by information such as a predetermined order in the speech communication terminal. This priority order may also be stated in the media field of the SDP offer.

Note that in the case of stating the bandwidth to make the bandwidth request, the bandwidth may also be stated in the SDP answer discussed later, without being stated in the SDP offer. Alternatively, the terminals may not state anything in the SDP messages, and instead, an intermediate node that extends a bearer may check the SDP content, judge and decide the requested bandwidth on the basis of the SDP content, and allocate the requested bandwidth.

Note that as in FIG. 3, the group relationship of the speech codecs may also be stated explicitly. By stating the group relationship in this way, setting the number of bearers extended when initiating telephony to one becomes clear.

The SDP message generation unit 201 of the callee, in response to an SDP offer from the caller, generates an SDP answer in a SIP 183 Session Progress message. FIGS. 4A, 4B, and 4C are examples of an SDP answer generated by the SDP message generation unit 201. In the media field of the SDP answer, the speech codecs and the speech codec modes that the callee speech communication terminal 200 supports from among the multiple speech codec and speech codec mode candidates stated in the SDP offer are stated. For example, in the case of FIG. 4A, the callee speech communication terminal 200 supports all four modes. These four modes constitute a second category. If the callee speech communication terminal 200 does not support EVS and only supports legacy AMR-WB, only the AMR-WB line (payload type 100), which corresponds to the EVS AMR-WB interoperable mode (WB), is selected and stated, like in FIG. 4B.

Note that, similarly to the first category, the second category is not limited to stating multiple speech codec modes, and may also include a name representing a collective set of multiple speech codec modes, or the second category itself may be a name representing a collective set of multiple modes.

In the same media field of the SDP answer, the bandwidth request is stated. This bandwidth request may be copied from the SDP offer in the case of the bandwidth being stated in the SDP offer, or be stated on the basis of a judgment of requested bandwidth by the judgment unit 207. FIG. 4A is an example of stating the maximum bandwidth request used by the modes included in the second category, or in other words the modes that the callee speech communication terminal 200 supports. In this example, the bandwidth requested by the SWB and the WB modes, namely, 80 kbps, is stated. FIG. 4C is an example of stating the bandwidth request of the mode with the highest priority from among the modes included in the second category, or in other words the modes that the callee speech communication terminal 200 supports. In this example, the bandwidth in the case of the NB mode being the highest-priority mode, namely, 30 kbps, is stated. The priority may be judged from information such as the statement order in the media field of the SDP offer, or a predetermined order in the speech communication terminal.

Figure 11:
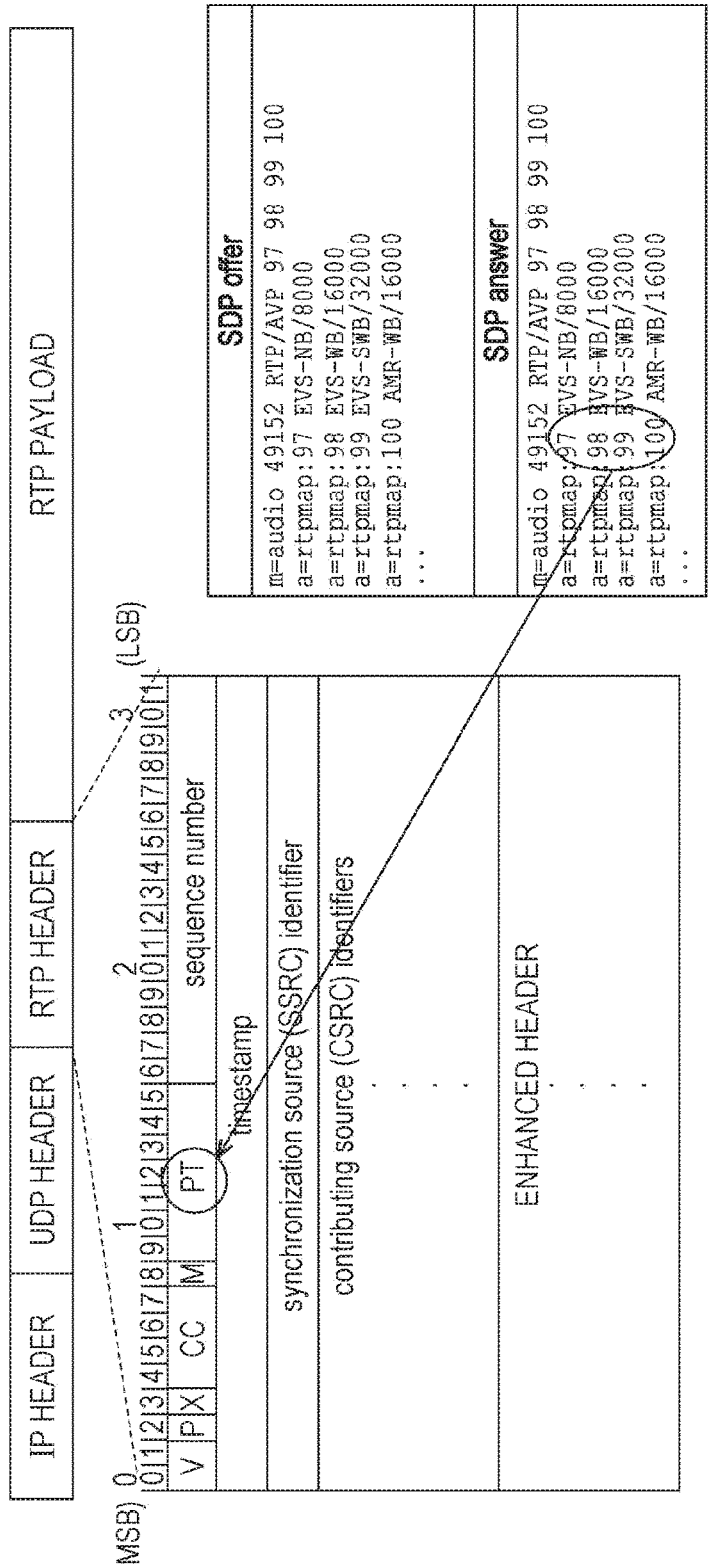
FIG. 11 is an explanatory diagram illustrating a structure of an RTP packet according to technology of the related art.

After resource allocation is conducted on the network side in accordance with the SDP offer and the SDP answer, and telephony is also initiated through a user call, the packet generation unit 102 generates RTP packets, which are packets for transmitting encoded speech data. The RTP packet structure is illustrated in FIG. 11. The packet generation unit 102 generates an RTP packet by reading out a clock rate from the storage unit 103, and using the read-out clock rate to add a timestamp to the RTP packet. Alternatively, instead of reading out the clock rate, a method of deciding the clock rate may be read out, the clock rate may be decided in accordance with the method, and the decided clock rate may be used to add a timestamp. The judgment unit 107 decides the clock rate. The clock rate and method of deciding the clock rate stored in the storage unit 103 will be discussed later.

In addition, if a need to switch the speech codec or the speech codec mode arises due to an event such as a handover, the packet generation unit 102 does not renegotiate with an SDP offer and answer, but instead specifies a payload type (PT) number assigned to the speech codec or speech codec mode after the switch in the payload type field of the RTP header, and thereby switches the speech codec or the speech codec mode (payload type switching). Payload type switching is similar to the technology of the related art described using FIG. 11. In this case, the clock rate may also be changed along with the switch. Also, even in the case of a switching method in which the mode information is included in the payload instead of the payload type switching method, renegotiation using an SDP offer and answer is not conducted, and the mode information included in the payload is used for mode switching. In this case, the clock rate likewise may also be changed along with the switch.

The packet generation unit 202 has the same configuration as the packet generation unit 102.

The storage unit 103 stores clock rates shared among the speech codecs and speech codec modes included in the second category, or a clock rate deciding method. For example, if the speech codecs included in the second category are EVS, the sampling rate of the AMR-WB non-interoperable mode (FB), namely, 48000 Hz, may be set for use as the clock rate. Furthermore, rather than a unique fixed clock rate as above, a method of deciding the clock rate may also be set. For example, in the case of setting a deciding method that takes the maximum from among the speech codec modes included in the second category, the clock rate becomes 32000 Hz in the case of FIG. 4A. Importantly, the set clock rate should be a clock rate shared among the speech codecs and speech codec modes included in the second category. In other words, in the case of switching modes without renegotiation, the switch occurs among the modes included in the second category, but the clock rate should not change over the range of the switch, or in other words, the timestamps should not change across the switch, or in other words, continuous timestamp values should be attached.

The storage unit 203 has the same configuration as the storage unit 103.

The control unit 104, besides realizing the functions of the SDP message generation unit 101 and the packet generation unit 102, performs input and output with respect to the storage unit 103, and controls the transmission unit 105 and the reception unit 106. Also, the control unit 104 realizes the function of the judgment unit 107. Specifically, the judgment unit 107 references the storage unit 103 to decide the clock rate, and supplies the decided clock rate to the packet generation unit 102. Also, the judgment unit 107 decides the requested bandwidth, and supplies the decided requested bandwidth to the SDP message generation unit 101. The control unit 204 has a configuration similar to the control unit 104.

The transmission unit 105 transmits the SDP offer generated by the SDP message generation unit 101 and RTP packets generated by the packet generation unit 102 to the reception unit 206 of the callee speech communication terminal 200, while the reception unit 206 receives the same.

In addition, the transmission unit 205 transmits the SDP answer generated by the SDP message generation unit 201 and RTP packets generated by the packet generation unit 202 to the reception unit 106 of the caller speech communication terminal 100, while the reception unit 106 receives the same.

Note that the control unit 104, which includes the SDP message generation unit 101, the packet generation unit 102, and the judgment unit 107, as well as the storage unit 103 constitute a caller processing device. Additionally, the control unit 204, which includes the SDP message generation unit 201, the packet generation unit 202, and the judgment unit 207, as well as the storage unit 203 constitute a callee processing device. The caller processing device and the callee processing device correspond to the configuration on the component level, such as semiconductor elements, or on the semi-finished product level, such as a system board.

Figure 5:
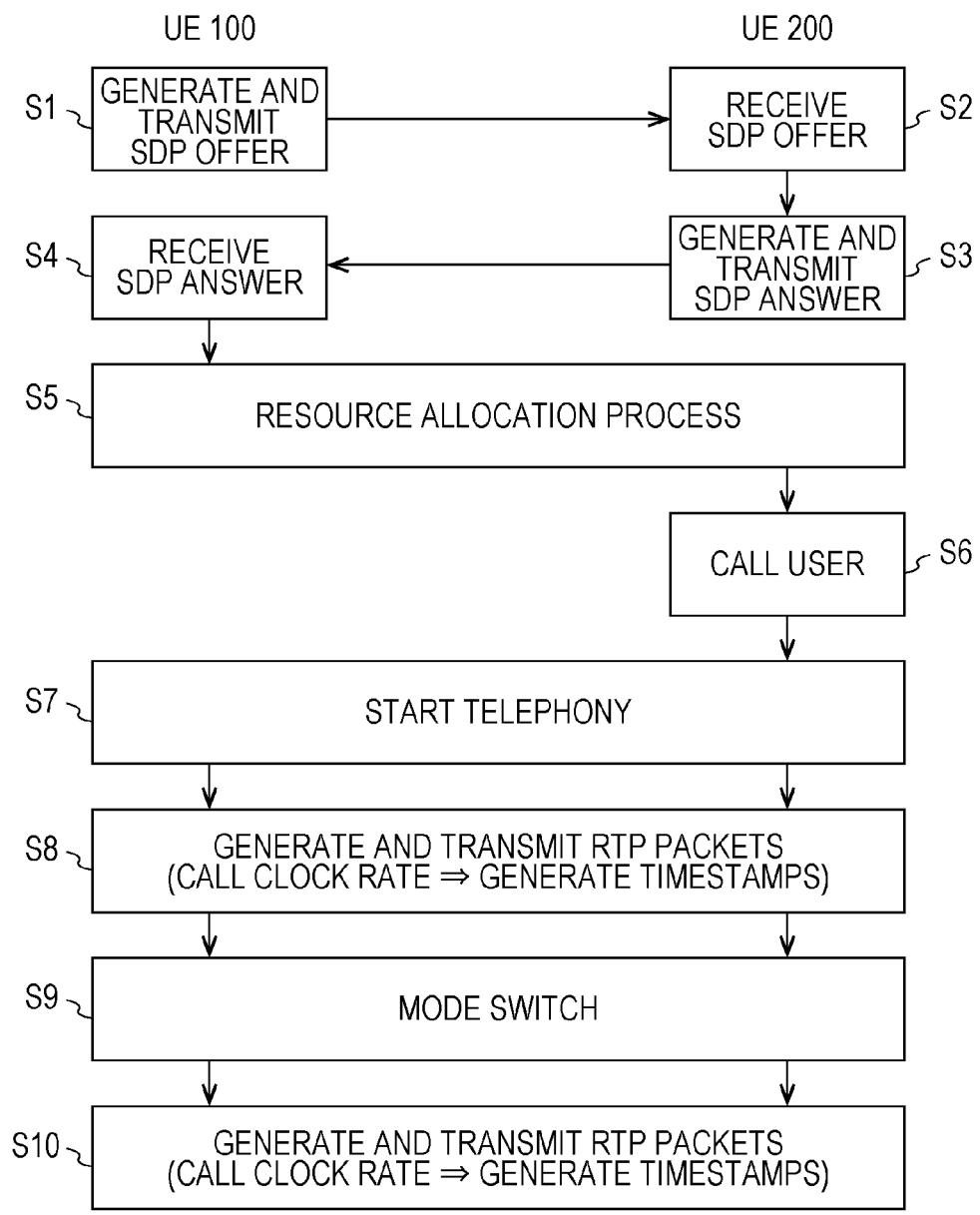
FIG. 5 is an explanatory diagram illustrating operation of a speech communication terminal according to Embodiment 1 of the present disclosure.

Next, operation of the caller speech communication terminal 100 and the callee speech communication terminal 200 will be described using FIG. 5. FIG. 5 is an explanatory operational diagram illustrating the operation (method) of the caller speech communication terminal 100 and the callee speech communication terminal 200 of the present disclosure.

First, the caller speech communication terminal 100 generates an SDP offer, and transmits to the callee speech communication terminal 200 (S1). In the case of making the bandwidth request on the caller speech communication terminal 100, such a request is stated in the SDP offer.

The callee speech communication terminal 200 receives the SDP offer transmitted from the caller speech communication terminal 100 (S2). Subsequently, in response to the SDP offer, an SDP answer is generated and transmitted to the caller speech communication terminal 100 (S3). In the case of making the bandwidth request on the callee speech communication terminal 200, such a request is stated in the SDP answer.

The caller speech communication terminal 100 receives the SDP answer transmitted from the callee speech communication terminal 200 (S4).

After telephony is initiated, RTP packets are generated by each of the caller speech communication terminal 100 and the callee speech communication terminal 200 to transmit coded speech data (S8). At this point, the clock rate is read out from the storage unit 103 or 203, the clock rate is decided by the judgment unit 107 in the control unit 104 or the judgment unit 207 in the control unit 204, and timestamps are attached according to the clock rate.

If a need for mode switching arises due to an event such as a handover, the speech codec or the speech codec mode is switched by specifying a payload type (PT) number from the caller speech communication terminal 100 or the callee speech communication terminal 200 (S9). If mode information is included in the payload instead of the payload type switching method, the mode is switched according to this information.

After switching, RTP packets are generated by each of the caller speech communication terminal 100 and the callee speech communication terminal 200 (S10). At this point, timestamps are attached according to the same clock rate as before the switch. In other words, the periodicity of the timestamps does not change across the switch. Note that in S10, the clock rate may be read out again from the storage unit 103 or 203, or the clock from before the switch may continue to be used, without performing a read-out operation from the storage unit 103 or 203.

Thus, according to the present embodiment, as a result of the clock rate not changing across a switch of the speech codec mode, the periodicity of the timestamps does not change across the mode switch, and thus playback control using a protocol such as the Real-time Control Protocol (RTCP) may be conducted without problems.

In addition, according to the present embodiment, it becomes possible to favorably guarantee the requested bandwidth on the network side.

(Embodiment 2)

The present embodiment describes another example of an SDP offer transmitted by the caller speech communication terminal 100.

Consider the case of performing negotiation by transmitting the callee speech communication terminal 200 the SDP offer of Embodiment 1 illustrated in FIG. 2A. If the callee speech communication terminal 200 that receives the SDP offer does not support EVS and only supports AMR-WB, the callee speech communication terminal 200 will select only the AMR-WB line (payload type 100) and transmit an SDP answer, like in FIG. 4B.

However, in the case of FIG. 2A, the bandwidth is set to 80 kbps, but when not conducting coding in an EVS AMR-WB non-interoperable mode, such a wide bandwidth is not necessary in many cases. In addition, if the grouping is stated explicitly like in FIG. 3, there is a possibility that the callee speech communication terminal 200 may be unable to select only the AMR-WB line (payload type 100) due to not supporting the SDP syntax used to perform the grouping like in FIG. 3.

Figure 6A:
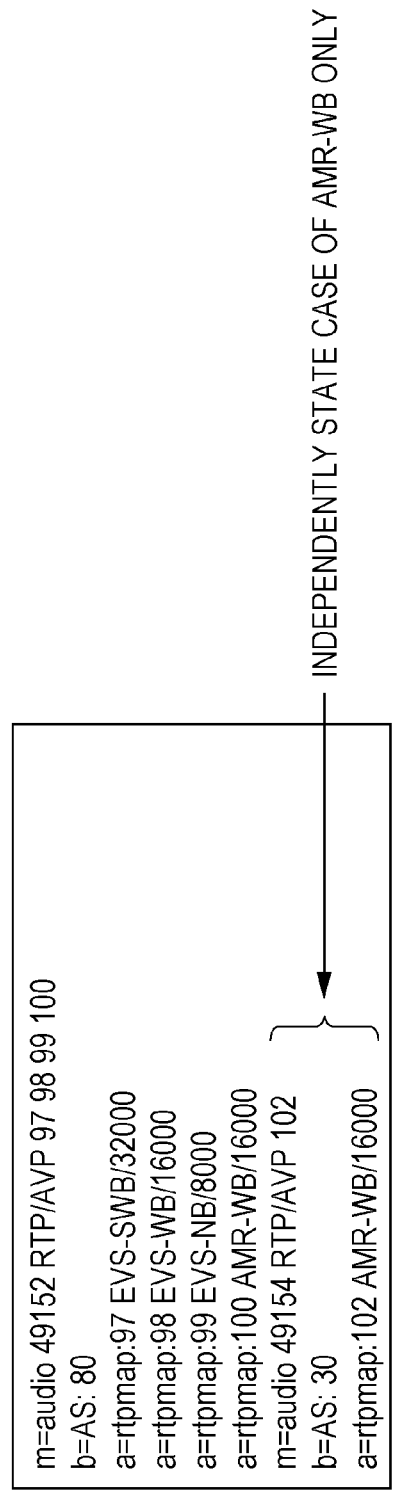
FIG. 6A is an explanatory diagram illustrating an SDP offer according to Embodiment 2 of the present disclosure.

Accordingly, in the present embodiment, the four supported modes are all stated on the first media line like in FIG. 6A, while in addition, only the EVS AMR-WB interoperable mode is separated and stated independently on the second media line. Note that the group relationship may also be expressed on the first media line like in FIG. 6B. Note that even if the modes are stated like in FIG. 6A or 6B, the second media line is removed from the SDP answer if EVS is selected on the callee speech communication terminal 200, whereas the first media line is removed from the SDP answer if AMR-WB is selected on the callee speech communication terminal 200. Thus, a single bearer is used for telephony.

In this way, by separating and stating only the EVS AMR-WB interoperable mode on a separate media line, the necessary and appropriate bandwidth for the EVS AMR-WB interoperable mode may be set independently.

Note that, as another mode of the present embodiment, the caller speech communication terminal 100 may transmit the SDP offer in FIG. 2A similarly to Embodiment 1, and the requested bandwidth value may be changed and stated by the responding callee speech communication terminal 200, or by an intermediate network node.

Note that the functions of the speech communication terminals 100 and 200 in Embodiments 1 and 2 may also be implemented in a node that anchors SDP messages and speech data, such as a media gateway manager (MGM), or the ATCF or ATGW of SRVCC with ATCF enhancement.

(Embodiment 3)

The present embodiment describes an intermediate node 300 positioned between the caller speech communication terminal 100 and the callee speech communication terminal 200 described in Embodiment 1 or 2.

Figure 7:
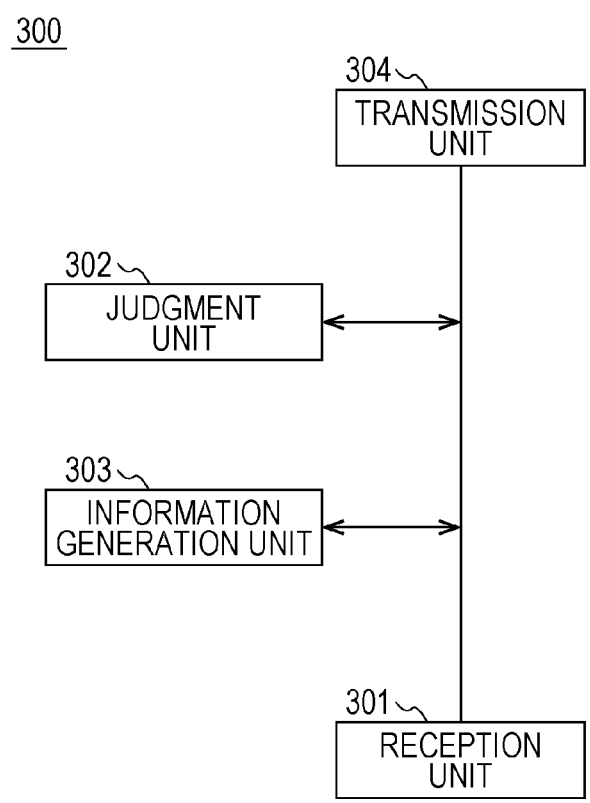
FIG. 7 is a configuration diagram of an intermediate node according to Embodiment 3 of the present disclosure.
Figure 8:
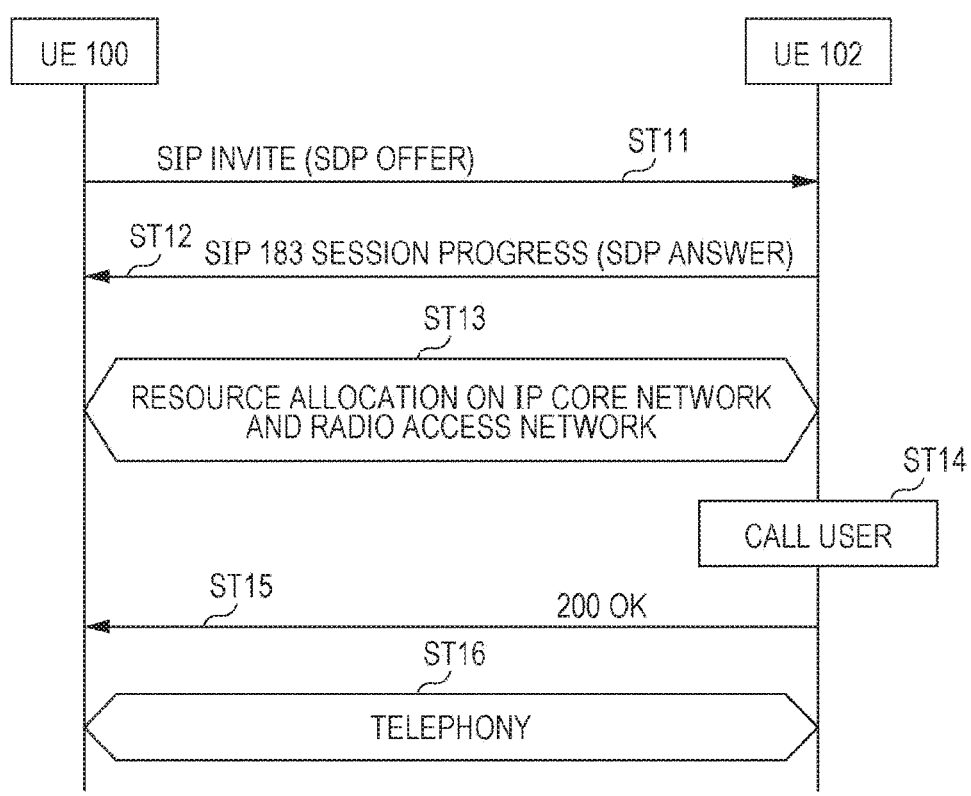
FIG. 8 is an explanatory diagram illustrating a call control method according to technology of the related art.
Figure 10:
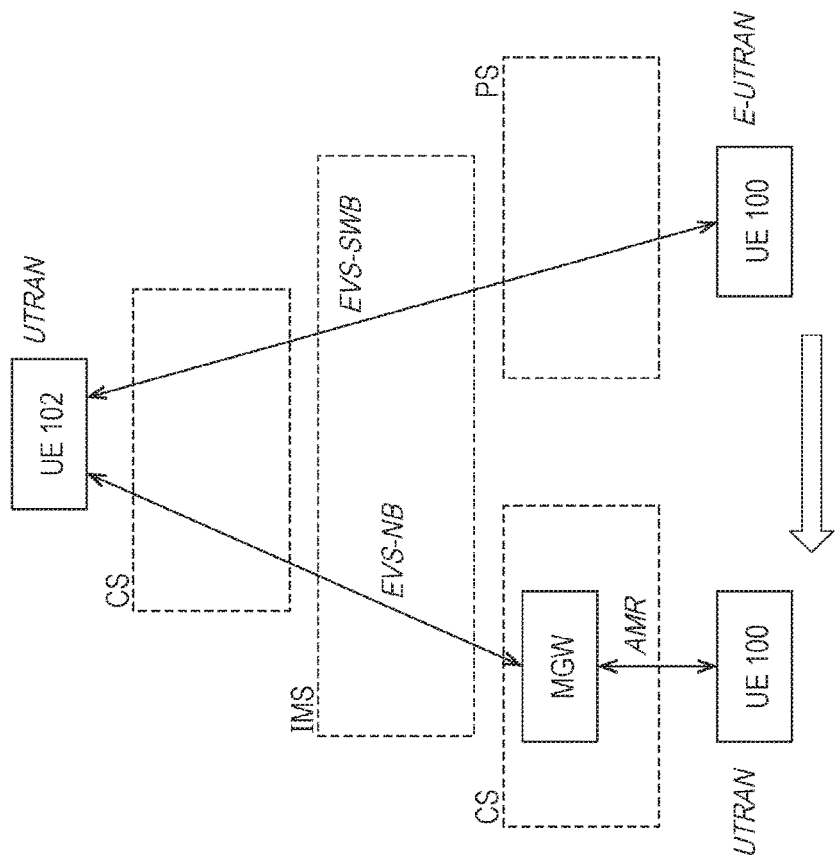
FIG. 10 is an explanatory diagram illustrating a handover according to technology of the related art.

FIG. 7 is a block diagram illustrating a configuration of an intermediate node, such as the P-CSCF, that checks the content of an SDP offer or an SDP answer. The intermediate node 300 includes a reception unit 301, a judgment unit 302, an information generation unit 303, and a transmission unit 304.

The intermediate node 300 typically corresponds to the Proxy-Call Session Control Function (P-CSCF), but may also be realized by some other node that forwards SDP messages.

The reception unit 301 receives an SDP message, that is, an SDP offer or an SDP answer, from the caller speech communication terminal 100 or the callee speech communication terminal 200.

The judgment unit 302 judges the bandwidth to request from a network node that configures Quality of Service (QoS) settings. This bandwidth may be predetermined by the operator, or based on the content of the SDP offer or the SDP answer received by the reception unit 301. For example, if a bandwidth is stated explicitly in the SDP offer or the SDP answer, that bandwidth may be used. If a bandwidth is not stated explicitly in the SDP offer or the SDP answer, the requested bandwidth is judged from other information, such as the media field. For example, in the case of a codec that supports multiple modes, the maximum bandwidth among the supported modes or the bandwidth of the mode with the highest priority may be used.

The information generation unit 303 generates information for reporting the requested bandwidth judged by the judgment unit 302 to the network node that configures Quality of Service (QoS) settings.

The transmission unit 304 transmits the information generated by the judgment unit 302 to the network node. In addition, the received SDP message is forwarded to the caller speech communication terminal 100 or the callee speech communication terminal 200.

Note that the judgment made by the judgment unit 302 or the information created by the information generation unit 303 may include not the requested bandwidth, but also information such as other policies and charging information. In addition, the network node that configures Quality of Service (QoS) settings refers to an entity such as the Policy and Charging Rules Function (PCRF) on a 3GPP network, for example. Note that the judgment by the judgment unit 302 or the information generation by the information generation unit 303 may also not be completed by a single network node, but instead performed in coordination with another node.

CONCLUSION

The above thus describes a speech communication terminal of the present disclosure according to Embodiments 1 and 2, and an intermediate node of the present disclosure according to Embodiment 3. The speech communication terminal of the present disclosure and the intermediate node of the present disclosure encompass not only the case of being realized as specially designed hardware, but also the case of being realized by installing a program that executes the operation (method) of the present disclosure on general-purpose hardware, and executing the program with a processor. Examples of computers that act as general-purpose hardware include personal computers and various kinds of mobile information terminals such as smartphones.

A speech communication terminal according to the present disclosure encompasses not only the case of handling speech signals, but also the case of handling music signals. Furthermore, application to equipment related to the recording, transmission, and playback of speech signals or music signals is also possible.

What is claimed is:

1. A connection method between speech communication terminals, comprising:
    stating, in a first speech communication terminal, a plurality of speech codec modes in a Session Description Protocol (SDP) offer, and transmitting the SDP offer to a second speech communication terminal;
    selecting, in the second speech communication terminal, and stating, in an SDP answer, two or more speech codec modes from among the speech codecs modes stated in the SDP offer, and transmitting the SDP answer to the first speech communication terminal;
    connecting the first speech communication terminal and the second speech communication terminal on a single bearer, wherein
    at least one of the SDP offer and the SDP answer states a request for a maximum bandwidth or a bandwidth of a mode of highest priority from among the speech codec modes stated in the SDP answer; and
    switching a speech codec or a speech codec mode without changing a clock rate used to add timestamps to Real-Time Transport Protocol (RTP) packets and without renegotiating the speech codec or the speech codec mode, by specifying a payload type (PT) number assigned to the speech codec or speech codec mode after a change in a payload type field of an RTP header.

2. A connection method between speech communication terminals, comprising:
    stating, in a first speech communication terminal, a plurality of speech codec modes in a Session Description Protocol (SDP) offer, and transmitting the SDP offer to a second speech communication terminal;
    selecting, in the second speech communication terminal, and stating, in an SDP answer, two or more speech codec modes from among the speech codec modes stated in the SDP offer, and transmitting the SDP answer to the first speech communication terminal;
    connecting the first speech communication terminal and the second speech communication terminal on a single bearer,
    referencing, in an intermediate node positioned between the first speech communication terminal and the second speech communication terminal, the received SDP offer or the received SDP answer, and requesting a maximum bandwidth or a bandwidth of a mode of highest priority from among the speech codec modes included in the SDP answer; and
    switching a speech codec or a speech codec mode without changing a clock rate used to add timestamps to Real-Time Transport Protocol (RTP) packets and without renegotiating the speech codec or the speech codec mode, by specifying a payload type (PT) number assigned to the speech codec or speech codec mode after a change in a payload type field of an RTP header.

3. A caller processing device used by a caller speech communication terminal that connects with a callee speech communication terminal by exchanging a Session Description Protocol (SDP) offer and an SDP answer attached to Session Initiation Protocol (SIP) messages, comprising:
    a processor that generates the SDP offer stating a plurality of speech codec modes;
    a transmitter that transmits the SDP offer to the callee speech communication terminal; and
    a receiver that receives the SDP answer corresponding to the SDP offer from the caller speech communication terminal, the SDP answer stating two or more speech codec modes selected from among the speech codec modes stated in the SDP offer, and also stating a request for a maximum bandwidth or a bandwidth of a mode of highest priority from among the speech codec modes included in the SDP answer, wherein
    the caller speech communication terminal and the callee speech communication terminal connect on a single bearer; and
    wherein the processor specifies a payload type (PT) number in a payload type field of a Real-Time Transport Protocol (RTP) header such that, switching of a speech codec or a speech codec mode is performed without changing a clock rate used to add timestamps to RTP packets and without renegotiating the speech codec or the speech codec mode, by specifying the payload type (PT) number assigned to the speech codec or speech codec mode after a change in a payload type field of an RTP header.

4. The caller processing device according to claim 3, wherein the caller processing device is included in the caller speech communication terminal.

5. A callee processing device used by a callee speech communication terminal that connects with a caller speech communication terminal by exchanging a Session Description Protocol (SDP) offer and an SDP answer attached to Session Initiation Protocol (SIP) messages, comprising:

a processor that conducts a reception process of receiving the SDP offer stating a plurality of speech codec modes transmitted from the caller speech communication terminal;

wherein the processor generates the SDP answer stating two or more speech codec modes selected from among the speech codec modes stated in the SDP offer, and also stating a request for a maximum bandwidth or a bandwidth of a mode of highest priority from among the speech codec modes stated in the SDP answer, wherein the caller speech communication terminal and the callee speech communication terminal connect on a single bearer; and wherein the processor specifies a payload type (PT) number in a payload type field of a Real-Time Transport Protocol (RTP) header such that switching of a speech codec or a speech codec mode is performed without changing a clock rate used to add timestamps to RTP packets and without renegotiating the speech codec or the speech codec mode, by specifying the payload type (PT) number assigned to the speech codec or speech codec mode after a change in the payload type field of an RTP header.

6. The callee processing device according to claim 5, wherein callee processing device is included in the callee speech communication terminal, and wherein the callee speech communication terminal comprises:
  a receiver that receives the SDP offer from the caller speech communication terminal; and
  a transmitter that transmits the SDP answer to the caller speech communication terminal.

7. A system, comprising:
a caller speech communication terminal;
a callee speech communication terminal; and
an intermediate device that performs a connection service between the caller speech communication terminal and the callee speech communication terminal by exchanging a Session Description Protocol (SDP) offer and an SDP answer attached to Session Initiation Protocol (SIP) messages, wherein the caller communication terminal includes:
  a first processor that generates the SDP offer stating a plurality of speech codec modes;
  a first transmitter that transmits the SDP offer to the callee speech communication terminal;
  a first receiver that receives the SDP answer corresponding to the SDP offer from the caller speech communication terminal, the SDP answer stating two or more speech codec modes selected from among the speech codec modes stated in the SDP offer, and also stating a request for a maximum bandwidth or a bandwidth of a mode of highest priority from among the speech codec modes included in the SDP answer, wherein
  the caller speech communication terminal and the callee speech communication terminal connect on a single bearer; and wherein the callee communication terminal includes:
  a second processor that conducts a reception process of receiving the SDP offer stating the plurality of speech codec modes transmitted from the caller speech communication terminal;
  wherein the second processor generates the SDP answer stating the two or more speech codec modes selected from among the speech codec modes stated in the SDP offer, also stating the request for a maximum bandwidth or the bandwidth of the mode of highest priority from among the speech codec modes stated in the SDP answer;
  a second receiver that receives the SDP offer from the caller speech communication terminal; and
  a second transmitter that transmits the SDP answer to the caller speech communication terminal, wherein the first processor of the caller communication terminal or the second processor of the callee communication terminal specifies a payload type (PT) number in a payload type field of an Real-Time Transport Protocol (RTP) header such that switching of a speech codec or a speech codec mode is performed without changing a clock rate used to add timestamps to RTP packets and without renegotiating the speech codec or the speech codec mode, by specifying the payload type (PT) number assigned to the speech codec or speech codec mode after a change in a payload type field of an RTP header; and wherein the intermediate node communication terminal includes:
  a third receiver that receives the SDP offer generated by the caller speech communication terminal and stating the plurality of speech codec modes, and the SDP answer generated by the callee speech communication terminal and stating the two or more speech codec modes selected from among the speech codec modes stated in the SDP offer;
  a third processor that references the received SDP offer and the received SDP answer and determines the maximum bandwidth or the bandwidth of the mode of highest priority from among the speech codec modes included in the SDP answer, and generates a determination result; and
  a third transmitter that transmits the determination result to a network node.

8. A connection method performed by a caller speech communication terminal that connects with a callee speech communication terminal, comprising:
  generating a Session Description Protocol (SDP) offer stating a plurality of speech codec modes;
  transmitting the SDP offer to the callee speech communication terminal;
  receiving, from the callee speech communication terminal, an SDP answer stating two or more speech codec modes selected from among a plurality of speech codec modes stated in the SDP offer, and also stating a request for a maximum bandwidth or a bandwidth of a mode of highest priority from among the speech codec modes included in the SDP answer, wherein
  the caller speech communication terminal and the callee speech communication terminal connect on a single bearer; and
  switching a speech codec or a speech codec mode without changing a clock rate used to add timestamps to Real-Time Transport Protocol (RTP) packets and without renegotiating the speech codec or the speech codec mode, by specifying a payload type (PT) number assigned to the speech codec or speech codec mode after a change in a payload type field of an RTP header.

9. A connection method performed by a callee speech communication terminal that connects with a caller speech communication terminal, comprising:
  receiving, from the caller speech communication terminal, a Session Description Protocol (SDP) offer stating a plurality of speech codec modes;

generating an SDP answer stating two or more speech codec modes selected from among the speech codec modes stated in the SDP offer, and also stating a request for a maximum bandwidth or a bandwidth of a mode of highest priority from among the speech codec modes stated in the SDP answer;

transmitting the SDP answer to the caller speech communication terminal, wherein the caller speech communication terminal and the callee speech communication terminal connect on a single bearer; and switching a speech codec or a speech codec mode without changing a clock rate used to add timestamps to Real-Time Transport Protocol (RTP) packets and without renegotiating the speech codec or the speech codec mode, by specifying a payload type (PT) number assigned to the speech codec or speech codec mode after a change in a payload type field of an RTP header.

10. A non-transitory computer-readable recording medium storing a program that, when executed by a processor, causes a caller speech communication terminal to perform a connection method, the method comprising:

generating a Session Description Protocol (SDP) offer stating a plurality of speech codec modes;

transmitting the SDP offer to a callee speech communication terminal;

receiving, from the callee speech communication terminal, an SDP answer stating two or more speech codec modes selected from among the speech codec modes stated in the SDP offer, and also stating a request for a maximum bandwidth or a bandwidth of a mode of highest priority from among the speech codec modes included in the SDP answer, wherein the caller speech communication terminal and the callee speech communication terminal connect on a single bearer; and switching a speech codec or a speech codec mode without changing a clock rate used to add timestamps to Real-Time Transport Protocol (RTP) packets and without renegotiating the speech codec or the speech codec mode, by specifying a payload type (PT) number assigned to the speech codec or speech codec mode after a change in a payload type field of an RTP header.

11. A non-transitory computer-readable recording medium storing a program that, when executed by a processor, causes a callee speech communication terminal to perform a connection method comprising:

receiving, from a caller speech communication terminal, a Session Description Protocol (SDP) offer stating a plurality of speech codec modes;

generating an SDP answer stating two or more speech codec modes selected from among the speech codec modes stated in the SDP offer, and also stating a request for a maximum bandwidth or a bandwidth of a mode of highest priority from among the speech codec modes stated in the SDP answer;

transmitting the SDP answer to the caller speech communication terminal, wherein the caller speech communication terminal and the callee speech communication terminal connect on a single bearer; and switching a speech codec or a speech codec mode without changing a clock rate used to add timestamps to Real-Time Transport Protocol (RTP) packets and without renegotiating the speech codec or the speech codec mode, by specifying a payload type (PT) number assigned to the speech codec or speech codec mode after a change in a payload type field of an RTP header.

* * * * *